(12) United States Patent
Kremin et al.

(10) Patent No.: US 8,717,331 B2
(45) Date of Patent: May 6, 2014

(54) REDUCING WATER INFLUENCE ON A TOUCH-SENSING DEVICE

(75) Inventors: Viktor Kremin, Lviv (UA); Taras Kulyk, Lviv (UA); Oleksandr Karpin, Lviv (UA); Volodymyr Hutnyk, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 268 days.

(21) Appl. No.: 12/974,991

(22) Filed: Dec. 21, 2010

(65) Prior Publication Data

US 2012/0050214 A1 Mar. 1, 2012

Related U.S. Application Data

(60) Provisional application No. 61/376,400, filed on Aug. 24, 2010.

(51) Int. Cl.
*G06F 3/044* (2006.01)

(52) U.S. Cl.
USPC .......................................................... 345/174

(58) Field of Classification Search
CPC ........................................................ G06F 3/044
USPC .......................................................... 345/174
See application file for complete search history.

(56) References Cited

U.S. PATENT DOCUMENTS

| | | | | |
|---|---|---|---|---|
| 5,572,205 A | * | 11/1996 | Caldwell et al. | 341/33 |
| 5,796,183 A | * | 8/1998 | Hourmand | 307/116 |
| 6,504,530 B1 | * | 1/2003 | Wilson et al. | 345/173 |
| 6,730,863 B1 | * | 5/2004 | Gerpheide et al. | 178/18.02 |
| 2003/0067451 A1 | * | 4/2003 | Tagg et al. | 345/174 |
| 2004/0188151 A1 | * | 9/2004 | Gerpheide et al. | 178/18.01 |
| 2004/0189616 A1 | * | 9/2004 | Gerpheide et al. | 345/174 |
| 2004/0189617 A1 | * | 9/2004 | Gerpheide et al. | 345/174 |
| 2008/0062148 A1 | * | 3/2008 | Hotelling et al. | 345/174 |
| 2008/0136792 A1 | * | 6/2008 | Peng et al. | 345/174 |
| 2010/0065341 A1 | * | 3/2010 | Jeon | 178/18.06 |
| 2010/0200310 A1 | * | 8/2010 | Yeh et al. | 178/18.03 |
| 2010/0292945 A1 | * | 11/2010 | Reynolds et al. | 702/65 |

* cited by examiner

*Primary Examiner* — Claire X Pappas
*Assistant Examiner* — Robert Stone

(57) ABSTRACT

A method and apparatus for reducing water influence on a touch-sensing device is described.

6 Claims, 16 Drawing Sheets

REDUCING WATER INFLUENCE ON A TOUCH-SENSING DEVICE

RELATED APPLICATIONS

This application claims the benefit of U.S. Provisional Application No. 61/376,400, filed Aug. 24, 2010, the entire contents of which are hereby incorporated by reference.

TECHNICAL FIELD

Embodiments of the present invention relate to the field of user interface devices and, in particular, to touch-sensing devices.

BACKGROUND

Computing devices, such as notebook computers, personal data assistants (PDAs), and mobile handsets, have user interface devices, which are also known as human interface devices (HID). One type of user interface devices that has become more common is touch-sensing devices, such as touch-sensor pads (also commonly referred to as touchpads), touch-sensor sliders, touch-sensor buttons, touch-sensor keyboard, touchsreens, and touch panels.

A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display.

Another user interface device that has become more common is a touch screen. Touch screens, also known as touchscreens, touch panels, or touchscreen panels are display overlays, which are typically pressure-sensitive (resistive), electrically sensitive (capacitive), acoustically sensitive (SAW—surface acoustic wave), or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technology, such as optical imaging, resistive, surface wave, capacitive, infrared, dispersive signal, and strain gauge technologies. Touch screens have become familiar in retail settings, on point of sale systems, on ATMs, on mobile handsets, on game consoles, and on PDAs where a stylus is sometimes used to manipulate the graphical user interface (GUI) and to enter data.

In general, capacitance-sensing devices are intended to replace mechanical buttons, knobs, and other similar mechanical user interface controls. Capacitance-sensing devices eliminate the complicated mechanical switches and buttons, providing the reliable operation under harsh conditions. In addition, capacitance-sensing devices are widely used in the modern customer applications, providing new user interface options in the exiting products. Some applications of capacitance-sensing devices, however, require the reliable operation in the presence of the water films or drops on the capacitance-sensing device. For example, various applications, such as household appliances, automotive applications, industrial application, need sensor elements that do not provide false triggering when the presence of water, ice, humidity, or the like exists and/or changes on the sensor elements.

BRIEF DESCRIPTION OF THE DRAWINGS

The present disclosure is illustrated by way of example, and not by way of limitation, in the figures of the accompanying drawings.

DETAILED DESCRIPTION

Figure 1A:
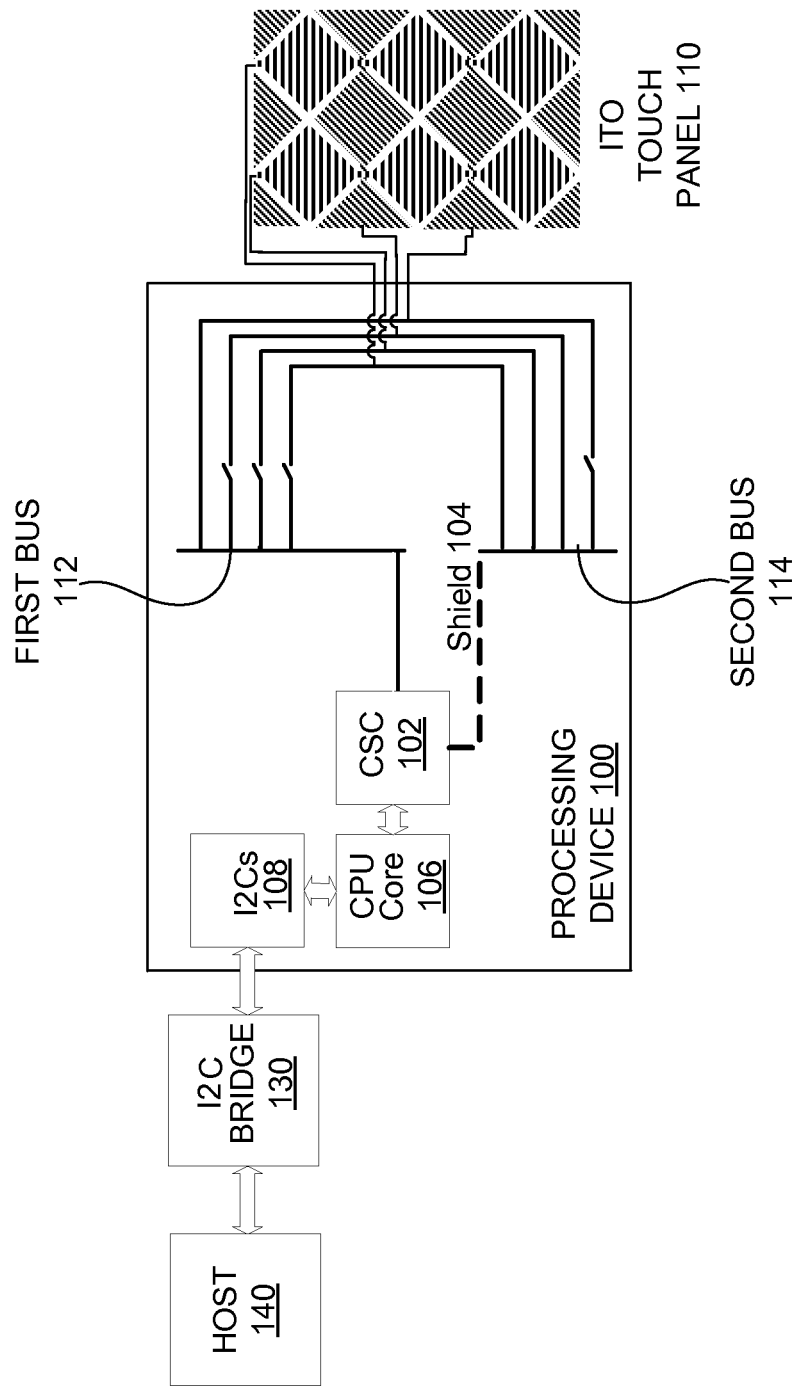
FIG. 1A illustrates a block diagram of a processing device having capacitance-sensing circuitry configured to apply a shield signal to sensor elements of an Indium-tin-oxide (ITO) touch panel according to one embodiment.

Apparatuses and methods of measuring a capacitance on a selected one or more of multiple sensor elements of a touch-sensing device, while applying a shield signal to other non-selected ones of the plurality of sensor elements of the touch-sensing device, are described. In one embodiment, capacitance-sensing circuitry uses a first bus to measure a capacitance on a selected one or more of the sensor elements and a second bus to apply the shield signal to the other non-selected sensor elements while measuring the selected sensor element. In one embodiment, the first bus is an analog bus and the second bus is a digital bus. Alternatively, the first and second buses are analog buses. In another embodiment, the shield signal is applied to each sense line via capacitors as described herein. The capacitance-sensing circuitry may apply a shield signal that is substantially the same in amplitude and phase as the signals being used to measure the capacitance. This may form a substantially equipotential surface for reducing water influence on the touch-sensing device.

In an alternative embodiment, instead of applying a shield signal to the non-selected sensor elements, an electrical self-conduction layer can be used to form a substantially equipotential touch surface. The conductivity of the electrical conduction layer may be the same as or greater than the conductivity of water. The electrical conduction layer introduces an artificial film of water on the touch-sensing surface so that the capacitance-sensing circuitry does not detect the presence of an actual water drop or water film, but can still detect a finger or other conductive object. Alternatively, the capacitance-sensing circuitry can detect other objects or touch objects. An object, or touch object, is any object that disturbs the electrical field and reduces the coupling between the receiver and transmitter electrodes. For example, if a user touches the touch surface wearing gloves, the capacitance-sensing circuitry may not detect the user's finger as a conductive object, but the capacitance-sensing circuitry can still detect the user's finger because the user's finger still disturbs the electrical field and reduces the coupling between the electrodes.

The general problem of self-capacitance based methods (e.g., Capsense Sigma-Delta (CSD)) on water is that both a finger and a drop give signals practically identical in form. The amplitude of CSD signals resulting from a presence of a finger is approximately 1.5 times greater than those signals resulting from a drop of water, but the CSD signals are very similar on form (e.g., direction of the raw counts signal change) and amplitude. In addition, the amplitude of the signal for a drop of water has small dependence on the thickness of a drop of water. If a finger is placed on the water drop, then the CSD signals will be approximately equal to the sum of reaction on touch of CSD signal and reaction on drop of water.

One approach to reducing water influence on the sensing device is using a shielding electrode that decreases the modulator current when water drops or film is present and increases the modulator current when a finger is present, as described in U.S. Patent Publication No. 2008/0111714, entitled "Capacitance to Code Converter with Sigma-Delta Modulator," filed Nov. 14, 2006, and assigned to the same assignee as the present invention. In this approach, the same clock signal that is used to precharge the sensor element is supplied to a shielding electrode. Here the sensor capacitance $C_x$ is the capacitance on the sensor element (e.g., switching capacitor) and the parasitic capacitance $C_{par}$ is between the shielding electrode and sensor element. The $C_{par}$ is discharged at $Ph_1$ phase and is charged at $Ph_2$ phase. The modulator current $I_{MOD}$ is algebraic sum of $C_x$ and $C_{par}$ currents $I_C$ and $I_{CPAR}$ respectively, which is represented in the following equation:

$$I_{mod}=I_C+I_{Cpar}=f_S C_S(V_{dd}-V_{Cmod})+f_S C_{par}(V_{dd}-V_{Cmod})$$
$$I_{mod}=f_S(C_s+C_{Par})(V_{dd}-V_{Cmod})$$

Where fs is the switches sample frequency, Vdd is the supply voltage, VCMOD is the voltage level on the sigma-delta modulator capacitor. As seen from the above equation, the modulator current is increased with $C_s$ and $C_{par}$ increasing. So the both water drops and finger touches increase the modulator current. This does not allow the capacitance-sensing circuitry to distinguish water drops from finger touches and the capacitance-sensing circuitry may detect water drops as false touches.

In contrast, in the embodiments using the shield signal, where shield signal with level $V_{dd}$ is applied to the parasitic capacitor $C_{Par}$ the modulator current is algebraic difference of $C_x$ and $C_{par}$ currents, which is represented in the following equation:

$$I_{mod}=I_C-I_{Cpar}=f_S C_S(V_{dd}-V_{Cmod})-f_S C_{par}V_{Cmod}$$

As seen from the above equation, the modulator current reduces any affect caused by the presence of water. By lowering modulator $V_{Cmod}$ voltage the parasitic capacitance current could be virtually eliminated. This allows the finger touches to be detected, while reducing false detections of touches caused by the presence of water. Also, this allows a touch to be detected even in the presence of water.

As described above, some applications of capacitance-sensing devices require reliable operation in the presence of the water films or drops on the capacitance-sensing device. The embodiments described herein may provide waterproofing solutions to reduce or eliminate water influence when detecting touches. By reducing or limiting water influence, the capacitance-sensing circuitry can accurately detect touches on the touch-sensing device, as well as reduce or eliminate detection of false touches caused by the presence of water. The embodiments described herein provide waterproof solutions for low-cost single-layer designs, as well as other types of touch-sensing devices.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

FIG. 1A illustrates a block diagram of a processing device 100 having capacitance-sensing circuitry (CSC) 102 configured to apply a shield signal 104 to sensor elements of an Indium-tin-oxide (ITO) touch panel 110 according to one embodiment. The sensor elements are electrodes that can have various shapes and that can be disposed in various patterns to form a touch-sensing surface of the ITO touch panel 110. The capacitance-sensing circuitry 102 is coupled to the ITO touch panel 110 via a first bus 112 and a second bus 114. In one embodiment, the first bus 112 is an analog bus and the second bus 114 is a digital bus, and the shield signal 104 is a digital signal. In another, the first bus 112 and the second bus 114 are both analog buses. The capacitance-sensing circuitry 102 scans the ITO touch panel 110 using the first bus 112 to measure the capacitance on the sensor elements of the ITO touch panel 110. While the capacitance-sensing circuitry 102 is measuring the capacitance on a selected one or more of the sensor elements, the capacitance-sensing circuitry 102 applies the shield signal 104 to other non-selected ones of the sensor elements using the second bus 114. In one embodiment, the capacitance-sensing circuitry 102 applies the shield signal 104 to all of the other non-selected ones of the sensor elements. In another embodiment, the capacitance-sensing circuitry 102 applies the shield signal 104 to a subset of less than all of the other non-selected ones of the sensor elements.

In one embodiment, the capacitance-sensing circuitry 102 selects the appropriate signal line on the first bus 112 for measuring the capacitance using a selection circuit (not illustrated), such as multiplexer or the like. Similarly, the capacitance-sensing circuitry 102 can select the appropriate signal lines of the second bus 114 using a selection circuit, such as a multiplexer or the like. In another embodiment, the capacitance-sensing circuitry 102 can apply the shield signal 104 to all of the lines on the second bus 114, and deselect the one signal line corresponding to the sensor element being measured. The capacitance-sensing circuitry 102 can scan each of the sensor lines of the first bus 112 sequentially or in other patterns as would be appreciated by those of ordinary skill in the art having the benefit of this disclosure.

In one embodiment, the shield signal 104 has a non-zero voltage potential. In another embodiment, the shield signal 104 has a substantially same amplitude as a signal used by the capacitance-sensing circuitry 102 to measure the capacitance on the selected sensor elements. In another embodiment, the shield signal 104 has a substantially same phase as a signal used by the capacitance-sensing circuitry 102 to measure the capacitance on the selected sensor elements. For example, the capacitance-sensing circuitry 102 may use 4.3 volts for measuring the capacitance and may use 5 volts for the shield signal 104. The voltage difference of 0.7 v is relatively small compared to the value of the sensing voltage, so changing the parasitic capacitance due water presence cause much smaller effect than touch. Also, taking into account shield signal is applied to the remaining sensors, the equipotential surface is created, additionally decreasing the water droplets and films influence. Having an equipotential or substantially equipotential surface reduces water influence on the ITO touch panel 110. In another embodiment, the shield signal has a shield voltage of 1.24 volts, and the precharge voltage, which is used for measuring the capacitance, is 1.2 volts. In other embodiment the shield signal amplitude is equal to the sensor amplitude.

In the depicted embodiment, the capacitance-sensing circuitry 102 is part of the processing device 100, which also includes a CPU core 106, and I2C interfaces 108, which communicate with a host processing device 140 over an I2C bridge 130. In other embodiments, the capacitance-sensing circuitry 102 may be implemented in other types of processing devices that have similar or dissimilar components as the processing device 100. In other embodiments, the CPU core 106 can communicate with the host processing device 140 using other communication devices and protocols than I2C as would be appreciated by those of ordinary skill in the art having the benefit of this disclosure. In some embodiments, the processing device 100 does not communicate with the host processing device 140 over the I2C bridge 130, but may communicate with other peripheral devices, or even no other external devices.

In this embodiment, the capacitance-sensing circuitry 102 measure the capacitance, and the processing device 100 is configured to detect a presence of an object on the ITO touch panel 110 using the measured capacitance. For example, the capacitance-sensing circuitry 102 may measure the capacitance and convert the capacitance into a digital value. The capacitance-sensing circuitry 102 is configured to detect a single touch and corresponding gestures, as well as multiple touches and corresponding multi-touch gestures. The CPU core 106 can process the digital values received from the capacitance-sensing circuitry 102 to detect a presence of an object, movement of the objects, such as the object's speed, acceleration, and distance. The CPU core 106 can also process the digital values to detect gestures performed by the object on the ITO touch panel 110. The CPU core 106 can also be used to receive raw data from the capacitance-sensing circuitry 102 to convert the raw data into digital values, etc. In another embodiment, the raw data is sent to the host processing device 140 for processing. In one embodiment, the host processing device 140 represents a processing device of one or more machines, such as a desktop computer, a laptop computer, other types of portable computers, a mobile device, a set-top box (STB), a personal data assistant (PDA), a server, a network router, a switch or bridge. In one embodiment, the processing device 100 is the PSoC® processing device offered by Cypress Semiconductor Corporation (San Jose, Calif.), such as described with respect to FIG. 7. Alternatively, the processing device 100 may be other types of processing devices as would be appreciated by those of ordinary skill in the art having the benefit of this disclosure. Alternatively, the capacitance-sensing circuitry 102 is integrated into the host processing device 140. Further, while only a single machine is illustrated for the host processing device 140, the term "machine" shall also be taken to include any collection of machines that individually or jointly execute a set (or multiple sets) of instructions to perform any one or more of the methodologies discussed herein. In another embodiment, an electronic system may include one or more host processing devices 140, processing devices 100, including the capacitance-sensing circuitry 102, as well as one or more peripheral devices.

The depicted embodiment of FIG. 1A illustrates the ITO touch panel 110 as the touch-sensing device. The shield signal 104 can significantly improve signal-to-noise ratio (SNR) for the ITO touch panel 110, and provide a waterproofing solution as described herein. Alternatively, the capacitance-sensing circuitry 102 can apply the shield signal to sensor elements of other types of touch-sensing devices, for example, a single-layer touch panel 120 illustrated in FIG. 1B.

In one embodiment, the shield signal 104 is used for waterproof scanning as described herein. For waterproof scanning, the shield signal 104 may be carried via two digital output buffers to the non-scanned pins. The sensor pin is disconnected from the shield signal 104, for example, using a register before scanning, and connects to the shield signal 104 when the sensor scanning is completed. In one embodiment, the shield signal 104 is carried via non-synchronized digital buffers. Alternatively, synchronized digital buffers may be used.

Figure 1B:
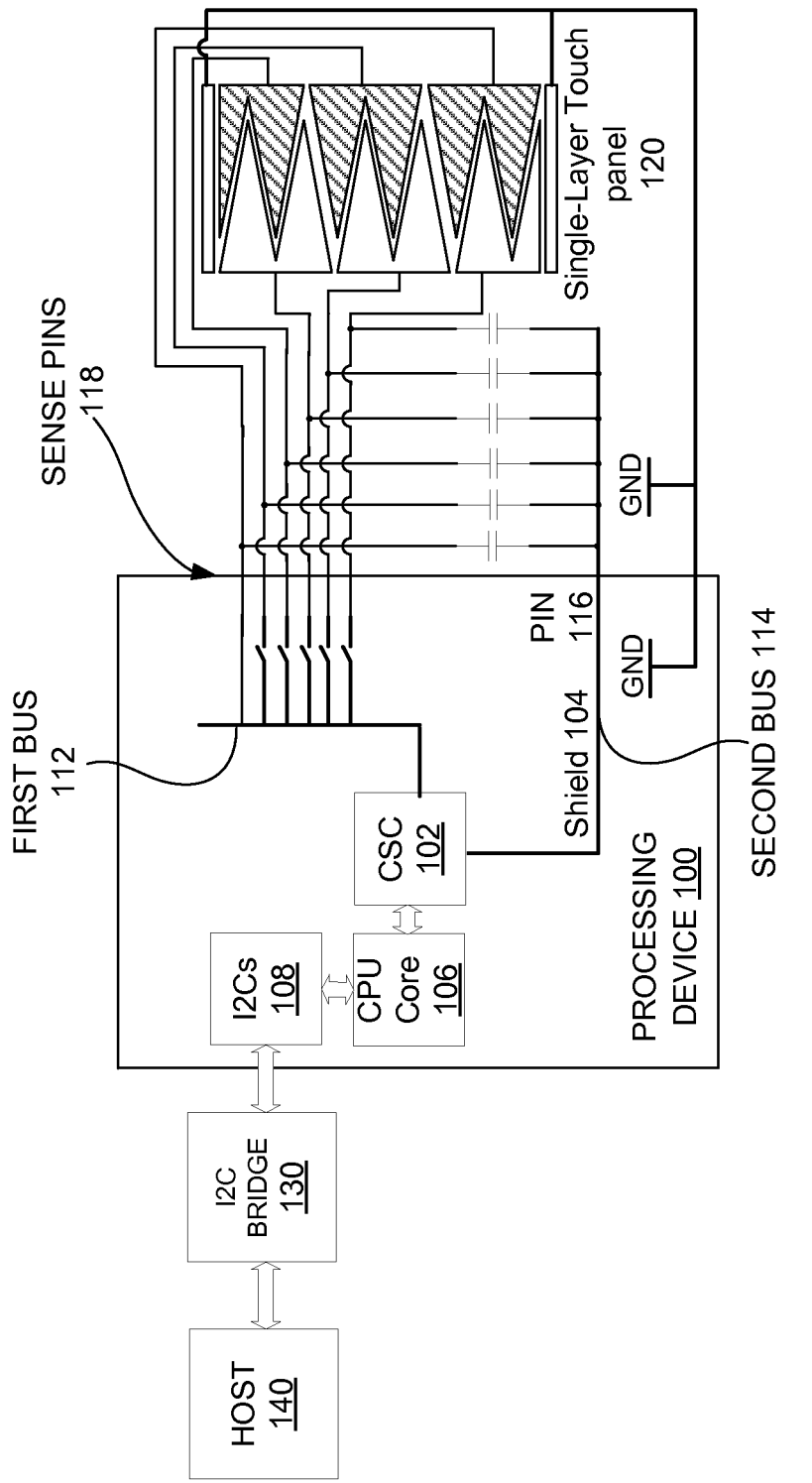
FIG. 1B illustrates a block diagram of a processing device having capacitance-sensing circuitry configured to apply a shield signal to sensor elements of a single-layer touch panel according to one embodiment.

FIG. 1B illustrates a block diagram of the processing device 100 having the capacitance-sensing circuitry 102 configured to apply the shield signal 104 to sensor elements of the single-layer touch panel 120. Similar components have been given the same reference numbers as those in FIG. 1A. The single-layer touch panel 120 has multiple sensor elements that are disposed on a single layer of the touch panel's assembly. For example, as depicted in FIG. 1B, the sensor elements are interlaced tapered sensor elements. Alternatively, other configurations are possible for the single-layer touch panel 120.

In the depicted embodiment of FIG. 1B, the capacitance-sensing circuitry 102 provides the shield signal 104 on a pin 116 of the processing device 100. In the depicted embodiment, the single-layer touch panel 120 includes six sensor elements (illustrated as three white sensor elements and three hashed-line sensor elements). Each of the six sensor elements is coupled to the pin 116 via a capacitor, as well as to one of the sense pins 118. Although the capacitors are depicted as external capacitors (i.e., external to the processing device 100), in other embodiments, the capacitors can be internal to the processing device 100). The first bus 112 is coupled to the six sensor elements using switches and the sense pins 118. In the depicted embodiment, the capacitance-sensing circuitry 102 measures the capacitance on the first sense line (closed switch), while the other sense lines are decoupled from the first bus 112 (open switches). Because the other sense lines are decoupled from the first bus 112, the capacitance-sensing circuitry 102 provides the shield signal 104 to the other sensor elements not being measured. In this embodiment, the capacitance-sensing circuitry 102 provides the shield signal 104 to a pin 116, which is connected to one terminal of each of the external capacitors, whose other terminal is coupled to the sensing lines (or the sensing pins 118) of the sensor elements. It should be noted that for some single-layer touch panels an additional shield layer can be used instead of external capacitors to provide the shield signal to the non-selected sensor elements.

In the depicted embodiment, the single-layer touch panel 120 includes two ground electrodes at the top and bottom of the single-layer touch panel 120. These ground electrodes can be grounded, and the same ground can be used to ground the processing device 100. In another embodiment, the ground electrodes can be coupled to the shield pin 116 when applying the shield signal 104 to all un-scanned lines. In other embodiments, the ground electrodes can be disposed to surround the sensor elements individually or collectively, or can be disposed to be adjacent to one or more of the sensor elements. In other embodiments, a separate shielding electrode may be used in addition to the shielding technique described herein. Alternatively, other configurations of the single-layer touch panel may be used as would be appreciated by one of ordinary skill in the art having the benefit of this disclosure.

FIGS. 2A-2D illustrate a touch-sensing device having multiple rows and multiple columns of a touch-sensing device. The multiple rows and columns are each individual sensor elements having a rectangular shape. As would be appreciated by one of ordinary skill in the art having the benefit of this disclosure, other shapes of sensor elements may be used. For example, rows and columns of tessellated shapes may be used. It should also be noted that there are various layout patterns of single-layer and multi-layer touch-sensing device for which the waterproofing techniques described herein may be used as would be appreciated by one of ordinary skill in the art having the benefit of this disclosure.

Figure 2A:
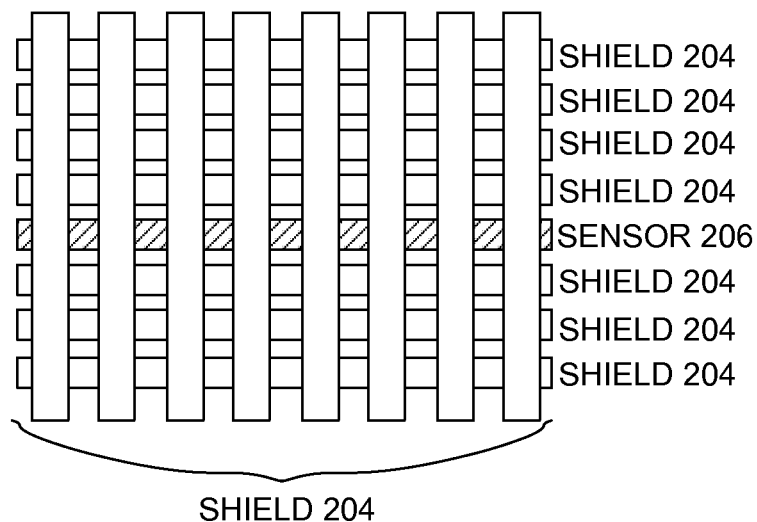
FIG. 2A illustrates a touch-sensing device having rows and columns where one of the rows is coupled to receive a sensor signal and all other rows and columns are coupled to receive a shield signal according to one embodiment.
Figure 2B:
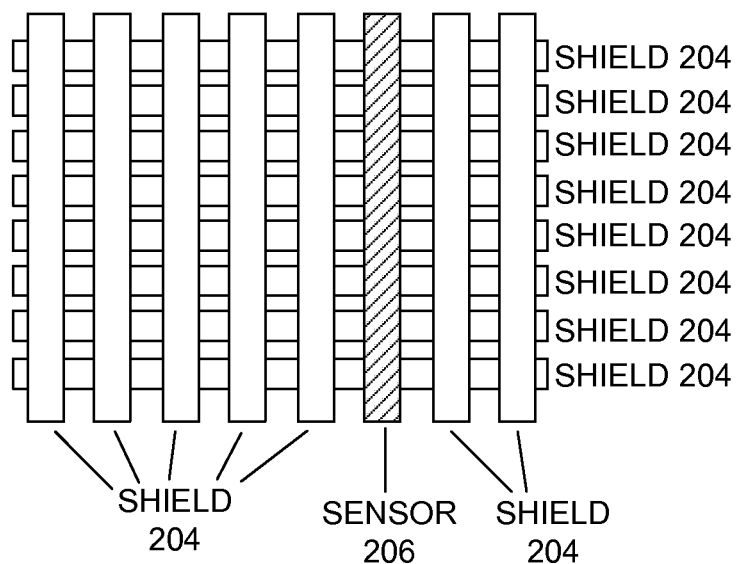
FIG. 2B illustrates a touch-sensing device having rows and columns where one of the columns is coupled to receive a sensor signal and all other columns and rows are coupled to receive a shield signal according to one embodiment.

In the embodiment of FIG. 2A, a selected one of the rows is coupled to receive a sensor signal 206 and all other non-selected rows and columns are coupled to receive a shield signal 204. During scanning, each of the rows can be sequentially scanned in which the selected row being scanned receives the sensor signal 206, while all other non-selected rows and columns are coupled to receive the shield signal 204. Similarly, as illustrated in the embodiment of FIG. 2B, a selected one of the columns is coupled to receive the sensor signal 206 and all other non-selected columns and rows are coupled to receive the shield signal 204. During scanning, each of the columns can be sequentially scanned in which the selected column being scanned receives the sensor signal 206, while all other non-selected columns and rows are coupled to receive the shield signal 204. Although in FIGS. 2A and 2B all other non-selected electrodes are connected to the shield signal 204, in other embodiments, less than all of the non-selected electrodes can be connected to the shield signal 204, such as illustrated in FIGS. 2C and 2D.

Figure 2C:
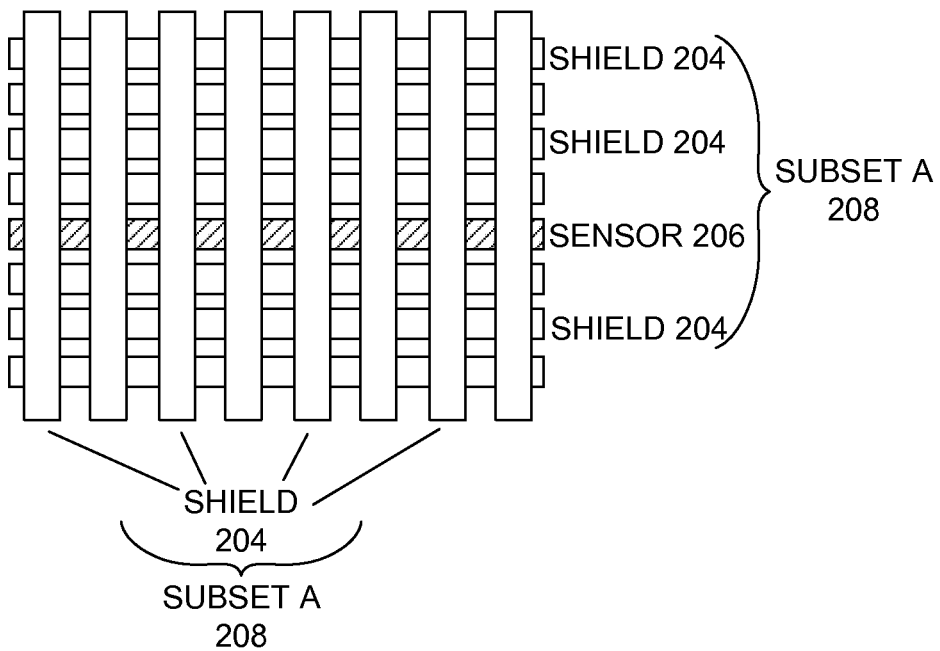
FIG. 2C illustrates a touch-sensing device having rows and columns where one of the rows is coupled to receive a sensor signal and a subset of the rows and columns are coupled to receive a shield signal according to one embodiment.
Figure 2D:
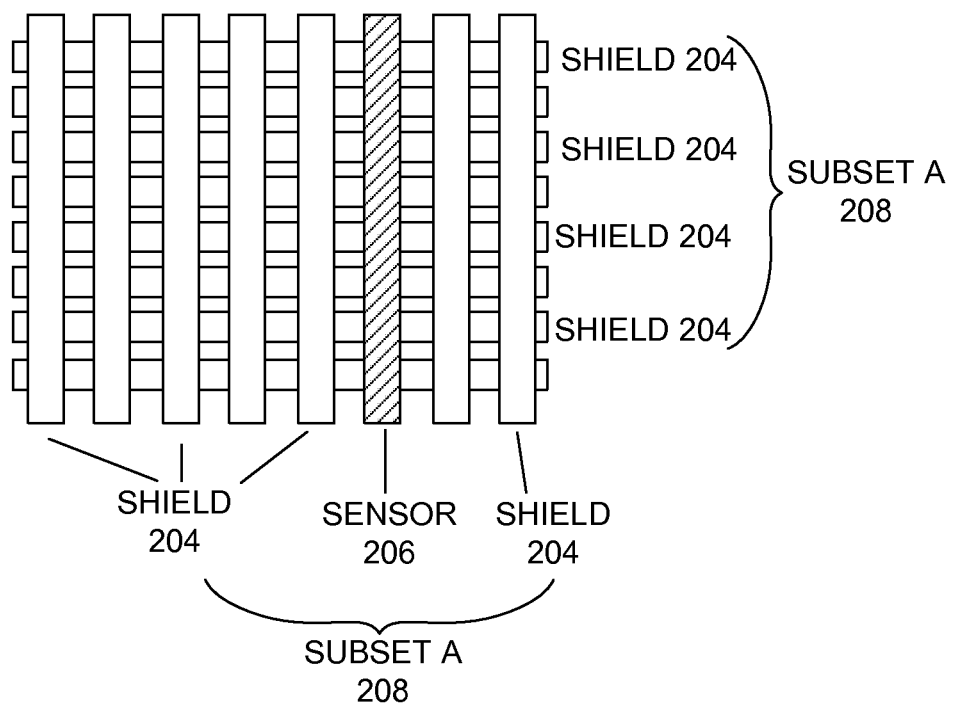
FIG. 2D illustrates a touch-sensing device having rows and columns where one of the columns is coupled to receive a sensor signal and a subset of the columns and rows are coupled to receive a shield signal according to one embodiment.

In the embodiment of FIG. 2C, a selected one of the rows is coupled to receive the sensor signal 206 and a subset A of the non-selected rows and columns is coupled to receive the shield signal 204. In this embodiment, every other one of the non-selected rows and every other one of the non-selected columns are part of the subset A 208. In other embodiments, the subset A may include every other non-selected row, but every other one of the non-selected columns. Alternatively, other subsets may be used as would be appreciated by one of ordinary skill in the art having the benefit of this disclosure. In other embodiments, the subset A may be dynamically adjusted to include more or less sensor elements to be coupled to the shield signal 204. For example, when the row being scanned is part of the subset, another row (e.g., an adjacent row) can be coupled to the shield signal 204, instead of the row being scanned. During scanning, each of the rows can be sequentially scanned in which the selected row being scanned receives the sensor signal 206, while the non-selected rows and columns of the subset A are coupled to receive the shield signal 204. Similarly, as illustrated in the embodiment of FIG. 2D, a selected one of the columns is coupled to receive the sensor signal 206 and a subset A of the non-selected columns and rows is coupled to receive the shield signal 204. In this embodiment, every other one of the columns and every other one of the rows are part of the subset A 208. In another embodiment, the subset A may include every other non-selected column, but every other one of the non-selected rows. As above, the subset A can include more or less rows or columns than the depicted embodiment, and the subset A can be dynamically adjusted. During scanning, each of the columns can be sequentially scanned in which the selected column being scanned receives the sensor signal 206, while the non-selected columns and rows of the subset A are coupled to receive the shield signal 204.

There are possible other embodiments of the proposed invention. In one embodiment the multiple parallel sensing channels are used instead one sensor channel, referred in the previous embodiments. These parallel sensing channels have the self-shielding properties, as sensing signals on the multiple channels are same in phase and amplitude. These additional sensing channels could be connected to the remaining panel electrodes instead applying the shield signal to them. For example, in one embodiment the shield and sensor electrodes could be interleaved. In a second embodiment, sensing channels are connected to all row electrodes and the shield driver is connected to all of the column electrodes.

The multiple configurations for the shield driver connection at the different scanning phases may provide balance between performance and power consumption, taking into account driving multiple electrodes with shield signal could significantly increase the power consumption of the low-power touch detection device.

Referring to FIGS. 1A-2D, the sensor elements of the touch-sensing surface (e.g., touch-sensing surface of the ITO touch panel 110 and the single-layer touch panel 120) can be printed on a printed circuit board or can be otherwise disposed on a substrate of a circuit board. The circuit board or printed circuit board typically includes an overlay that protects the underlying circuitry. Water or other conductive liquids could be disposed on the surface of the overlay, such as a drop of water. In other cases, a user's finger may be wet or may introduce water on the surface of the overlay when touching the device. When a water drop or water film is present on the overlay of the sensing device or on the user's finger, the water influences the ability to properly detect touches, gestures, and movement by an object. In some cases, the water drop or film is mistaken for a touch, and causes unintended operations by the processing device. For example, this may result in false triggering of button activation when no button has been pressed. Some of the embodiments described herein apply the shield signal to non-selected scan lines to provide water influence elimination. Embodiments of the waterproof scanning can be implemented in various applications, including low-cost, single-layer designs as described herein.

Figure 3:
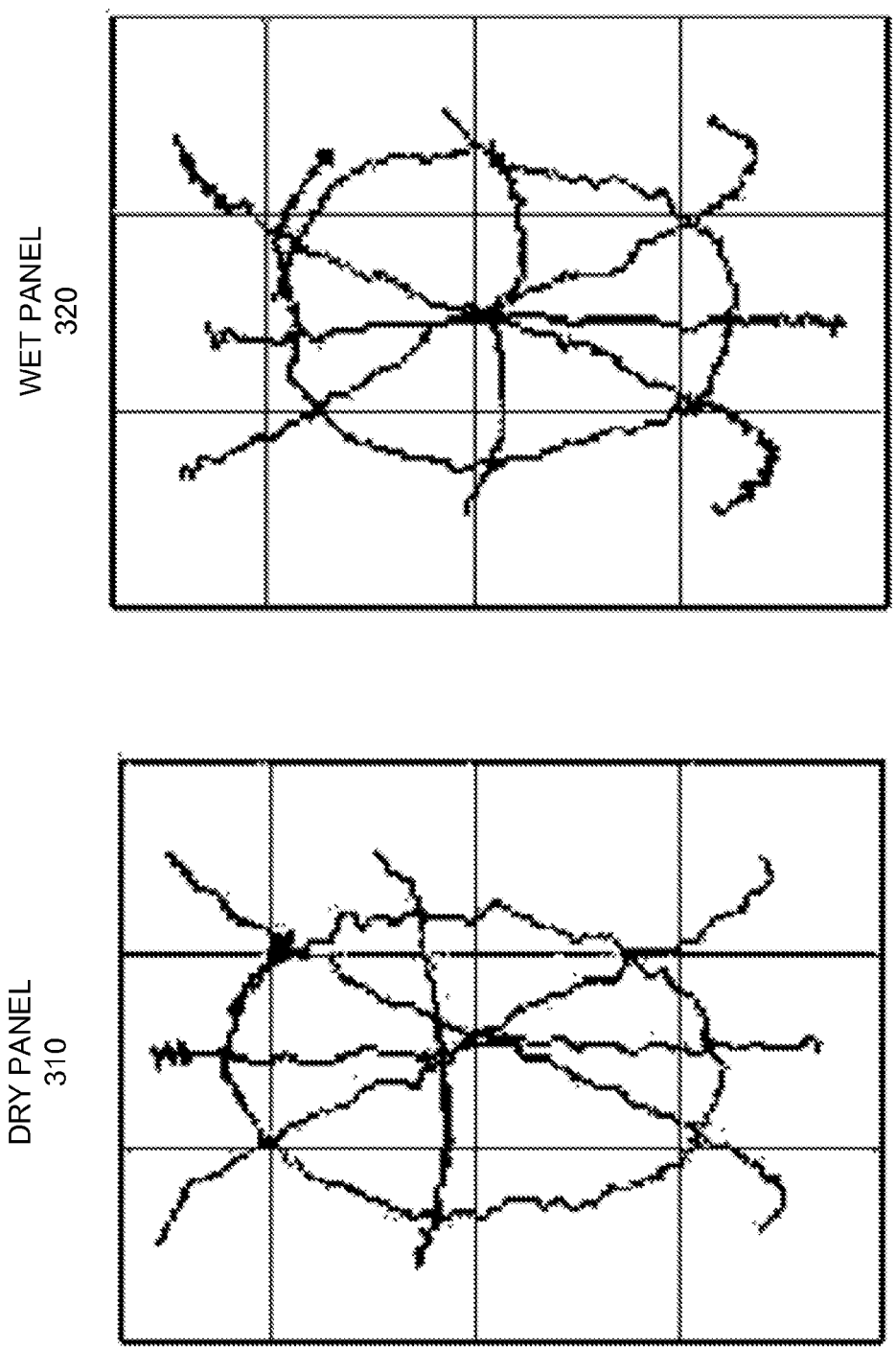
FIG. 3 illustrates coordinate calculations and linearity of a dry panel and a wet panel using waterproof scanning embodiments.

FIG. 3 illustrates coordinate calculations and linearity of a dry panel 310 and a wet panel 320 using waterproof scanning embodiments. As seen in FIG. 3, the linearity on the wet panel 320 is very similar to that of the dry panel 310. It should be noted that in some cases when the water drops or water film is substantial, the coordinate calculations and linearity may be affected. For example, big water drops may still increase signals on the covered sensor elements, disrupting correct coordinate calculations. Water drops covering several sensor elements may act as long conductor. As result, a touch by a finger in the area of the large water-drop may cause significant increase in the signals on all sensor elements covered by the large water drop, and the coordinate calculation may give incorrect results in some cases. In addition, edge coordinates/errors may be affected due to the signals increasing on wet sensor elements. It should be noted that connection of non-scanned sensors to the shield signal may cause increased sensitivity of the sensor elements, resulting in possible proximity effects. This happens because large equipotential surface generates electric far field. When no shielding is used, the sensor electric field is terminated by grounded adjacent sensors. For example, proximity effects may be detected when the finger is either approaching or leaving the panel, or in a non-active area near the edges. The negative side effects caused by this increased sensitivity may be reduced by careful selection of the touch thresholds as would be appreciated by one of ordinary skill in the art having the benefit of this disclosure.

Figure 4:
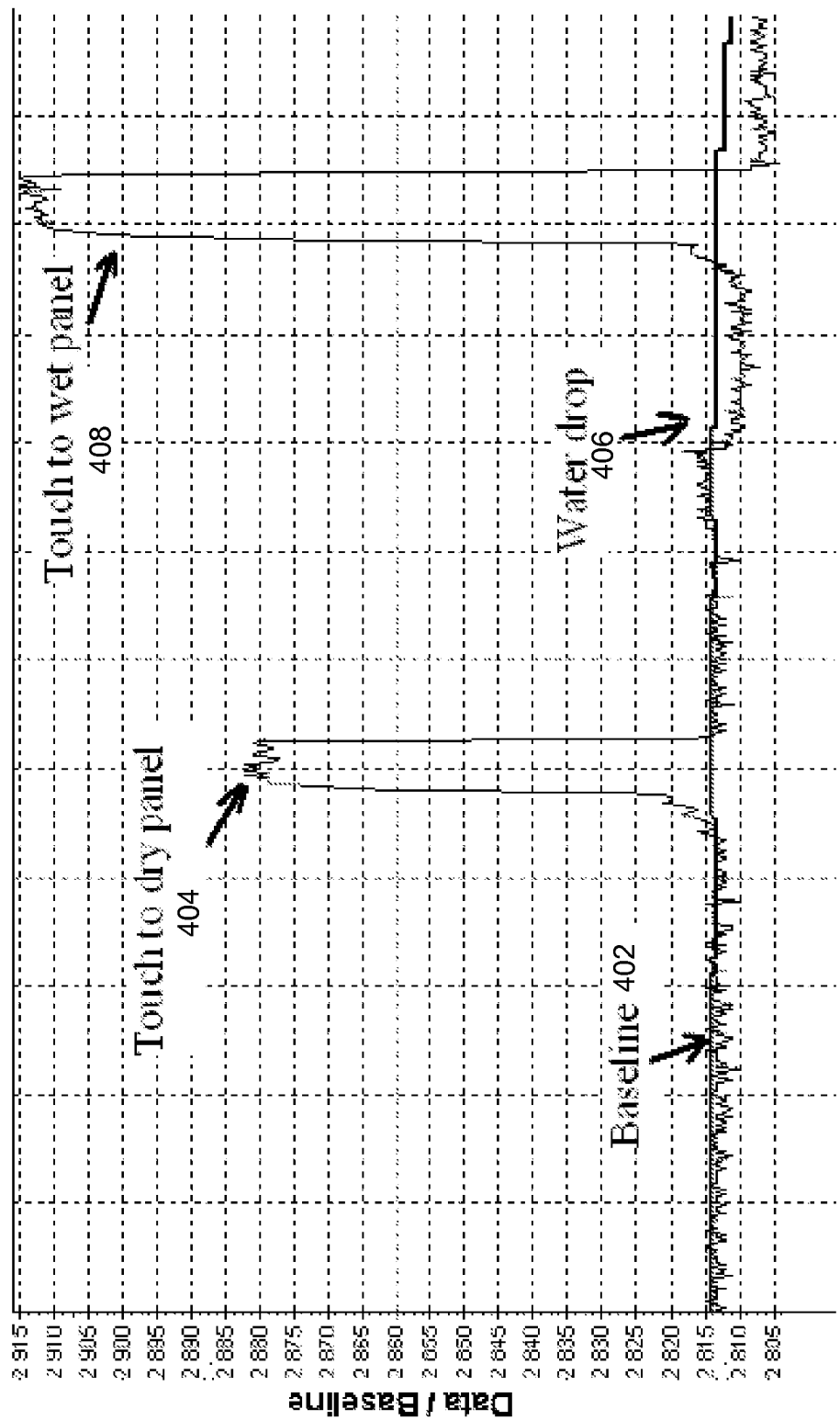
FIG. 4 illustrates water influence on touch scanning of the panel caused by the presence of water according to one embodiment.
Figure 5:
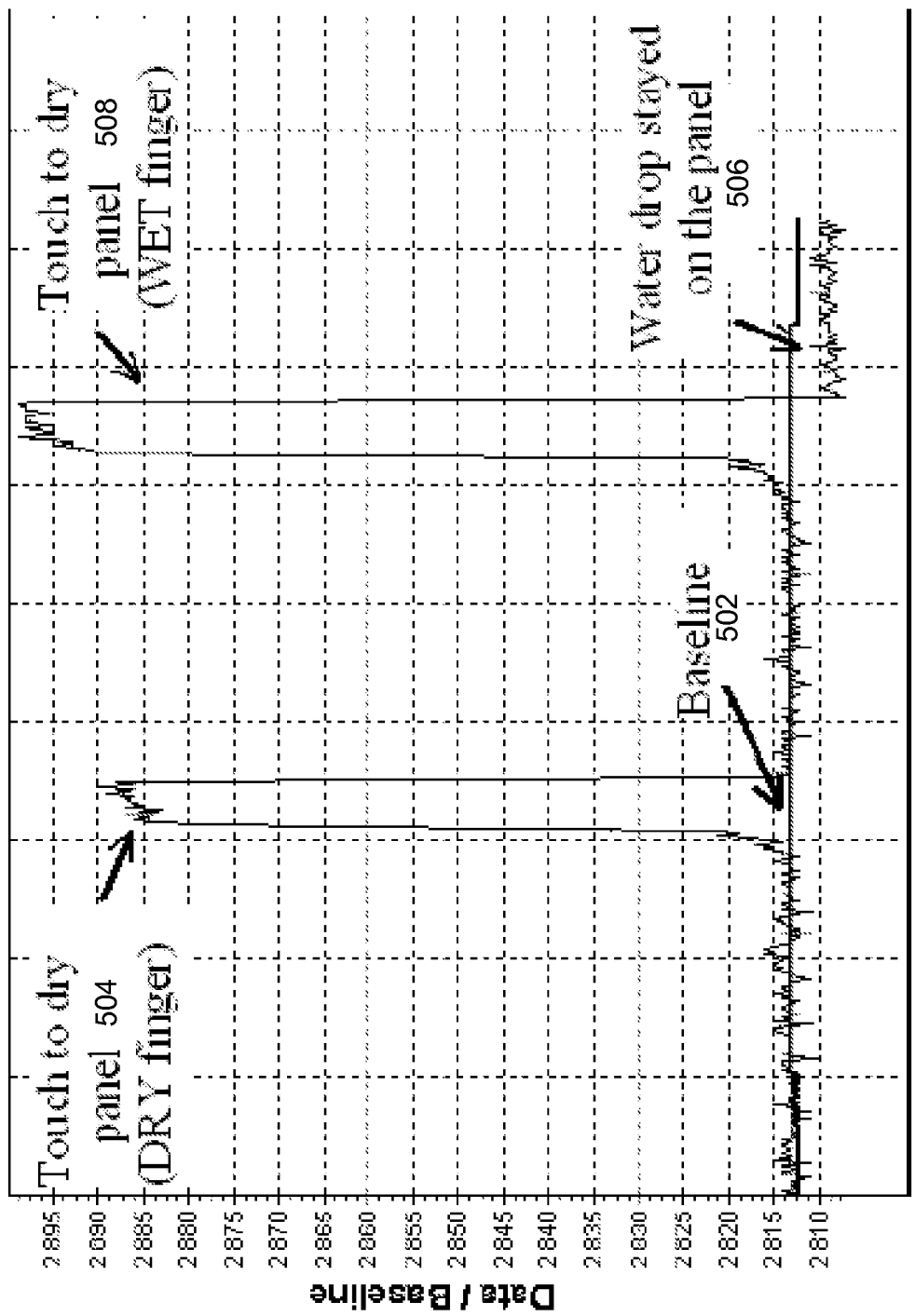
FIG. 5 illustrates water influence on touch scanning of the panel when the object is wet according to one embodiment.

Overall, embodiments of the waterproof scanning reduce the influence of water on the sensing device, as shown in the small negative reaction caused by a water drop on the wet panel 320, as illustrated in FIG. 4, or in the small negative reaction caused by a wet touch on a dry panel and the presence of water after the fact, as illustrated in FIG. 5. It should be noted that the presence of water increase both Cs and Cpar. However, if the shield signal amplitude is lower than the sensing signal amplitude, the sensor readings will increase with water, as with a finger, but water will have a lower signal amplitude. If the shield signal has higher amplitude than sensor signal, water reduces the sensor readings, having opposite change direction from touch. For example, if the shield voltage amplitude is larger than the sensor voltage amplitude, the water drop(s) will look like a negative change in capacitance, which is the opposite of a finger touch, as shown in FIGS. 4 and 5. When the voltage amplitude of the sensor is larger than the voltage amplitude of the shield, the water drop(s) will look like a positive change in capacitance, which is the same as a finger touch. Theoretically, when the shield signal and sensor signal are driven at the same voltage, the water drop(s) will not cause any change in measured capacitance.

FIG. 4 illustrates water influence on touch scanning of the panel caused by the presence of water according to one embodiment. Before scanning, the capacitance-sensing circuitry determines a baseline 402 for determining touches. During waterproof scanning, the capacitance-sensing circuitry detects a touch to dry panel 404, as well as a touch to the wet panel 408. In addition, as illustrated in FIG. 4, the capacitance-sensing circuitry does not detect a touch when there is a water drop 406 but no finger touching the panel.

FIG. 5 illustrates water influence on touch scanning of the panel when the object is wet according to one embodiment. Before scanning, the capacitance-sensing circuitry determines a baseline 502 for determining touches. During waterproof scanning, the capacitance-sensing circuitry detects a touch to dry panel 504, as well as a wet touch 508 (e.g., wet finger) to the dry panel. After the dry panel is touched with the wet finger 508, a water drop 506 stays on the panel. However, the capacitance-sensing circuitry does not detect a touch caused by the water drop 506.

In contrast, in conventional systems, the water influence can cause an increase in signal on the same level as a finger touch. For example, the water drops 406 and 506 would cause a spike in the signal, causing a touch to be incorrectly detected. Thus, the waterproof scanning embodiments described herein reduce water influence on the sensing device.

Figure 6A:
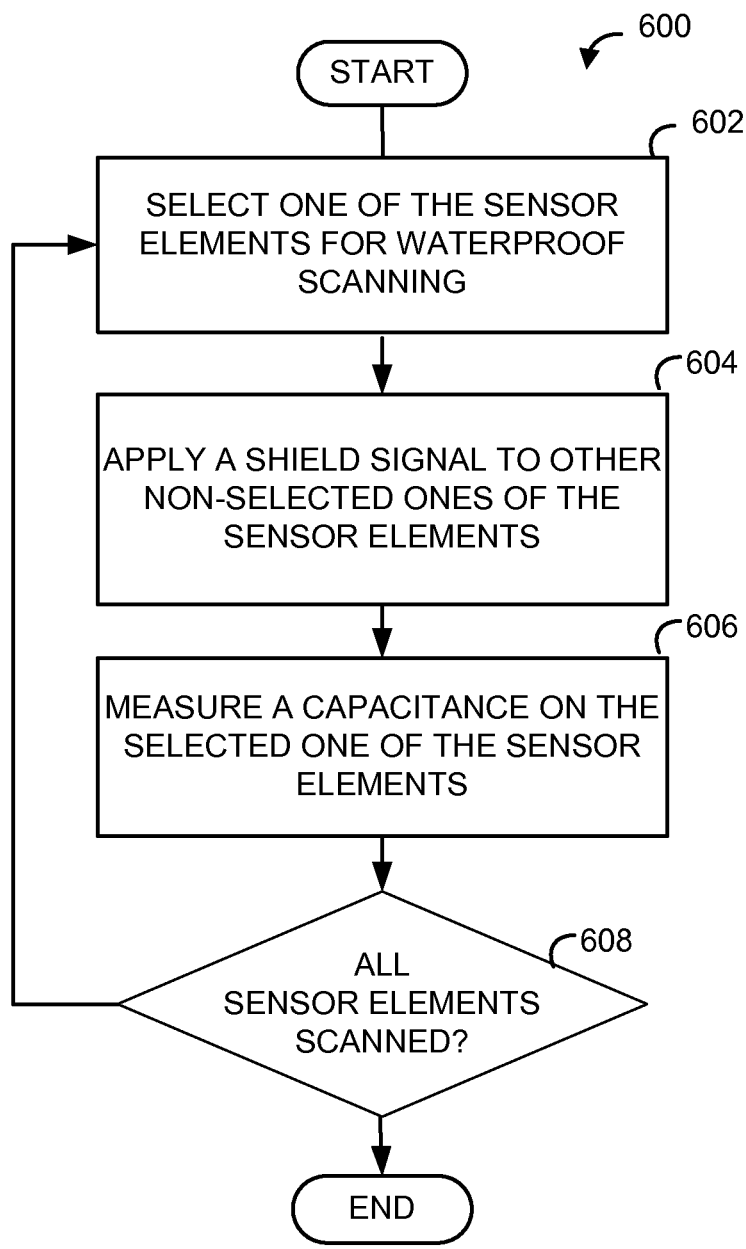
FIG. 6A is a flow diagram illustrating one embodiment of a method of waterproof scanning.

FIG. 6A is a flow diagram illustrating one embodiment of a method 600 of waterproof scanning. In some embodiments, processing logic may be used to perform the method 600. The processing logic may include hardware, software, or any combination thereof. In one embodiment, the processing device 100 of FIGS. 1A and 1B performs the method 600. In another embodiment, the capacitance-sensing circuitry 102 of FIGS. 1A and 1B perform the method 600. Alternatively, other components may be used to perform some or all of the operations of the method 600.

Referring to FIG. 6A, the process begins by selecting one of the sensor elements for waterproof scanning (block 602). The shield signal is applied to other non-selected ones of the sensor elements (block 604). This may be all of the other non-selected sensor elements or may be a subset of all as described above. Next, the capacitance is measured on the selected one of the sensor elements (block 606), while the shield signal is applied to the non-selected sensor elements. Next, the process determines if all of the sensor elements have been scanned (block 608). If not, the process returns to block 602 to select another sensor element; otherwise, the method 600 ends.

In one embodiment, the capacitance is measured at block 606 using a first bus, and the shield signal is applied at block 605 using a second bus. In one embodiment, the first bus is an analog bus and the second bus is a digital bus. In another embodiment, the capacitance is measured by supplying a first signal to the selected one of the sensor elements while a shield signal, having a substantially same amplitude and phase as the first signal, is applied to the non-selected sensor elements.

In another embodiment, the process performs a pin configuration of available pins for waterproof scanning, and connects each of the sensor elements to a sensing pin, as well as a shield pin. The shield signal can be applied to the shield pin via one or more digital buffers, and more than one shield pin may be used. The process can calibrate the sensor elements and determine baselines for each of the sensor elements. The process then can perform the waterproof scanning for all sensor elements, by disconnecting the pin from the shield signal using a register, for example, scanning the selected sensor element, updating the sensor baseline, if necessary, and reconnecting the pin to shield using the register. Using the scanned measurement(s), the process can perform a centroid calculation.

Figure 6B:
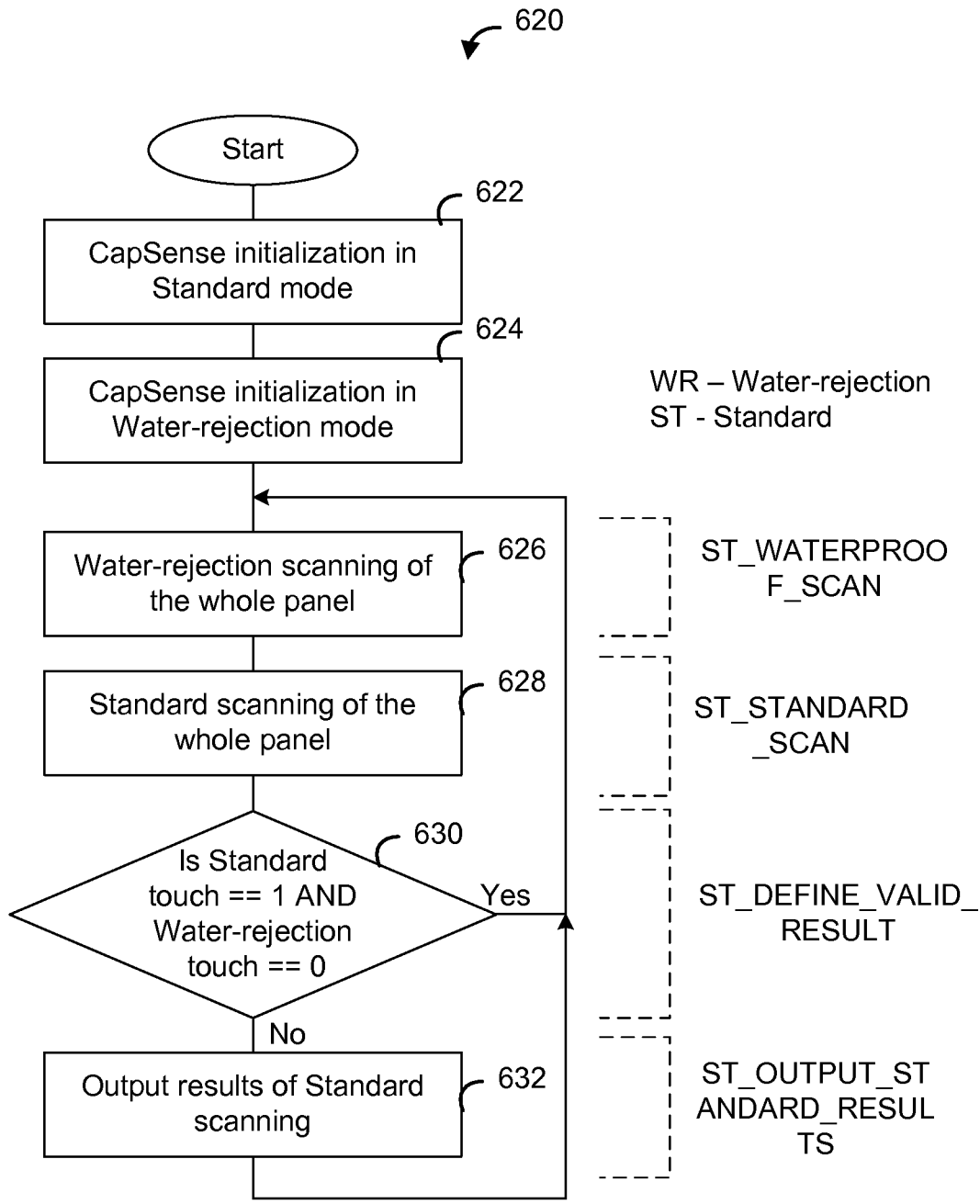
FIG. 6B is a flow diagram illustrating one embodiment of a method of multi-mode scanning, including standard scanning and waterproof scanning.
Figure 6C:
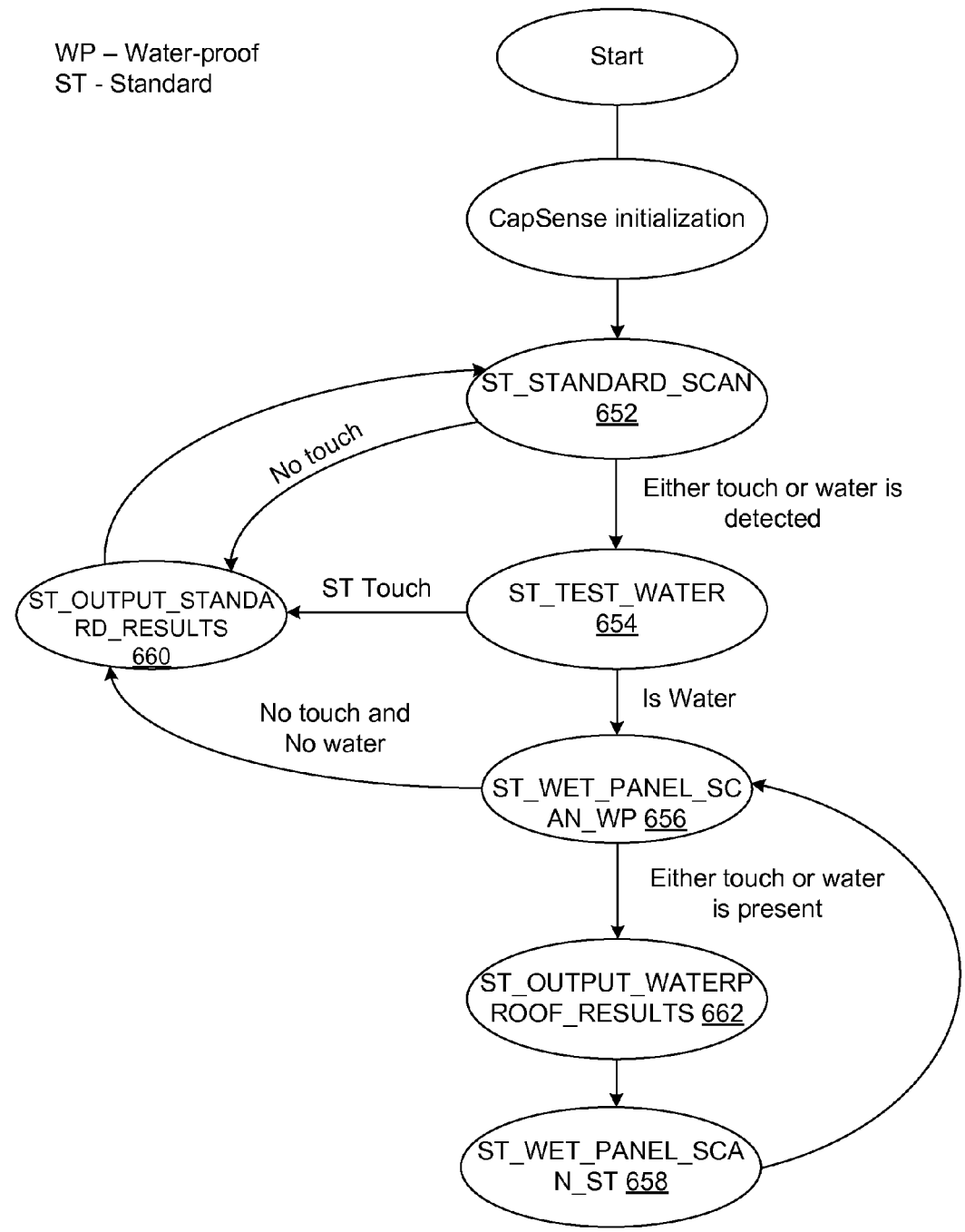
FIG. 6C is a state machine diagram illustrates switching between states of a multi-mode scanning.

In one embodiment, the waterproof scanning can be used in addition to standard scanning, as described with respect to FIGS. 6B-6C. During standard scanning, the shield signal output is disabled, and a precharge source is used to measure the capacitance (e.g., a pulse width modulator with prescaler 16, a pseudorandom sequence, or the like). During waterproof scanning, the shield signal is driven to the non-selected sensor elements via the capacitors, and a precharge source is used to measure the capacitance (e.g., a pseudorandom source with prescaler 4). During standard scanning, there may be a reaction caused by the presence of water. Whereas, during waterproof scanning, there is small positive reaction caused by the presence of water. By performing both standard and waterproof scanning, false detections of touches caused by water can be eliminated.

FIG. 6B is a flow diagram illustrating one embodiment of a method 620 of multi-mode scanning, including standard scanning and waterproof scanning. The method 620 is performed by processing logic that may comprise hardware (circuitry, dedicated logic, etc.), software (such as is run on a general purpose computing system or a dedicated machine), firmware (embedded software), or any combination thereof. In one embodiment, the processing device 100 of FIGS. 1A and 1B performs the method 620. Alternatively, other components can perform some or all of the operations of method 620.

Referring to FIG. 6B, processing logic begins with initializing capacitance sensing in standard scanning mode (block 622), and initializing capacitance sensing in water-rejection scanning mode (block 624). At block 626, the processing logic performs the water-rejection scanning of the whole panel, and, at block 628, the processing logic performs the standard scanning of the whole panel. At block 630, the processing logic determines if the standard scanning resulted in a touch (touch==1) and the water-rejection scanning resulted in a no-touch (touch==0). If not, the processing logic outputs the results of the standard scanning (block 632). Otherwise, the processing logic returns to block 626 to continue scanning. Similarly, after outputting the results, the processing logic returns to block 626 to continue scanning. In one embodiment, the standard scanning is performed without the shield signal for coordinate calculation, and the water-rejection scanning is performed for water detection. During standard scanning, the non-scanned sensors are grounded while scanned sensor is connected to the analog bus (e.g., first bus 112 of FIGS. 1A and 1B). During water-rejection scanning, all sensor elements are connected to the analog bus and are scanned as single sensor to detect the presence of water. This embodiment allows a waterproofing solution that does not require an additional shielding layer or external capacitors. Although, in other embodiments, if the processing device has the ability to connect the shield signal to all unscanned lines, there would also be no need for any capacitors or additional shielding layers too. In another embodiment, during water-rejection scanning, one sensor is scanned while the shield signal is applied to the other non-selected sensor elements (e.g., all or a subset of all non-selected sensor elements).

In another embodiment, the process uses a combination of standard scanning and water-rejection scanning, in which a shield signal is carried to non-scanned lines by using parasitic capacitance between the shield layer and sensor elements or additional external between the shield signal and ITO lines. This embodiment may provide waterproof sensing with noise immunity and with the similar accuracy as standard scanning methods. The waterproof function may be realized in hardware and software or a combination of hardware and software.

In one embodiment, firmware performs switching between standard and water-proof scanning methods depending on the absence or presence of water drops. In this embodiment, the process initializes the capacitance sensing, performs standard scanning of the whole panel, and determines if there is a touch. If not, the method continues using standard scanning. However, if a touch is detected, the processing logic determines whether the touch is a water touch or a standard touch. For example, the processing logic can perform a test for the presence of water by waterproof scanning for one local maxima sensor (using all the sensor elements). All sensor elements can be scanned periodically to track the respective baseline values of the sensor elements. Alternatively, all sensor elements or one side of panel can be scanned for waterproof scanning. Based on the scanning, if yes, the results are output according to standard scanning, and the process continues to perform standard scanning. However, if water is detected as being present, the processing logic performs waterproof scanning of whole panel to determine if the touch is a water touch or a standard touch. If the touch is not a water touch or a standard touch, the results are output and the process returns to standard scanning. If the touch is a water touch or a standard touch, the output of the waterproof scanning is output, and the processing logic performs standard scanning for the whole panel to perform a standard wet-panel scan, and returns to perform waterproof scanning of the whole panel. In this embodiment, the standard scanning may be performed with a PWM or PRS (pseudorandom sequence) precharge source (e.g., Prescaler=16, PRS 8 bit) when scanning the dry panel and for water presence detection. The water-proof scanning may be performed with PRS precharge source (Prescaler=4, PRS=8 bit) when scanning the wet panel and water presence detection. Using operation frequencies is possible, as parasitic capacitance is mostly compensated when scanning with shielding is used, so ITO panel could be operational at higher frequencies.

In one embodiment, the processing logic performs switching between states for scanning and outputting results. The switching between states may be performed according to a state machine, such as illustrated in the state machine diagram of FIG. 6C. For example, the following states may be used:

ST_STANDARD_SCAN 652=0x0—standard scanning of the whole panel.
ST_TEST_WATER 654=0x1—1 local maxima sensor testing to define either water drop or standard touch has been occurred; Water-proof scanning is used.
ST_WET_PANEL_SCAN_WP 656=0x2—waterproof scanning of the whole wet panel.
ST_WET_PANEL_SCAN_ST 658=0x3—standard scanning of the whole wet panel.
ST_OUTPUT_STANDARD_RESULTS 660=0x4—results output according to standard scanning.
ST_OUTPUT_WATERPROOF_RESULTS 662=0x5—results output according to water-proof scanning.

Figure 7:
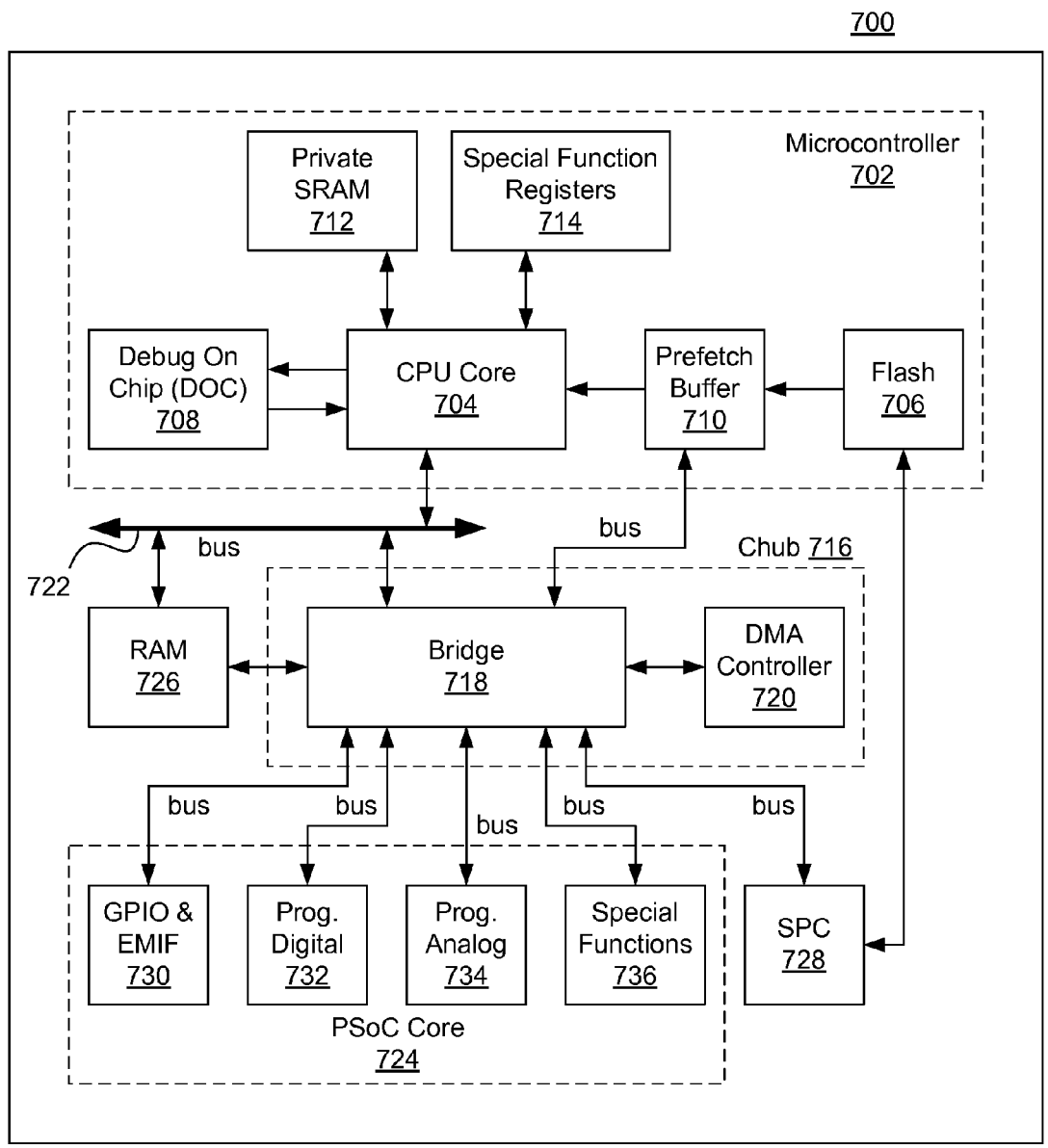
FIG. 7 illustrates an embodiment of a core architecture of the Programmable System-on-Chip (PSoC®) processing device.

FIG. 7 illustrates an embodiment of a core architecture 700 of the PSoC® processing device, such as that used in the PSoC3® family of products offered by Cypress Semiconductor Corporation (San Jose, Calif.). In one embodiment, the core architecture 700 includes a microcontroller 702. The microcontroller 702 includes a CPU (central processing unit) core 704, flash program storage 706, DOC (debug on chip) 708, a prefetch buffer 710, a private SRAM (static random access memory) 712, and special functions registers 714. In an embodiment, the DOC 708, prefetch buffer 710, private SRAM 712, and special function registers 714 are coupled to the CPU core 704 (e.g., CPU core 106), while the flash program storage 706 is coupled to the prefetch buffer 710.

The core architecture 700 may also include a CHub (core hub) 716, including a bridge 718 and a DMA controller 720 that is coupled to the microcontroller 702 via bus 722. The CHub 716 may provide the primary data and control interface between the microcontroller 702 and its peripherals (e.g., peripherals 250) and memory, and a programmable core 724. The DMA controller 720 may be programmed to transfer data between system elements without burdening the CPU core 704. In various embodiments, each of these subcomponents of the microcontroller 702 and CHub 716 may be different with each choice or type of CPU core 704. The CHub 716 may also be coupled to shared SRAM 726 and an SPC (system performance controller) 728. The private SRAM 712 is independent of the shared SRAM 726 that is accessed by the microcontroller 702 through the bridge 718. The CPU core 704 accesses the private SRAM 712 without going through the bridge 718, thus allowing local register and RAM accesses to occur simultaneously with DMA access to shared SRAM 726. Although labeled here as SRAM, these memory modules may be any suitable type of a wide variety of (volatile or non-volatile) memory or data storage modules in various other embodiments.

In various embodiments, the programmable core 724 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 724 includes a GPIO (general purpose IO) and EMIF (extended memory interface) block 730 to provide a mechanism to extend the external off-chip access of the microcontroller 702, a programmable digital block 732, a programmable analog block 734, and a special functions block 736, each configured to implement one or more of the subcomponent functions. In various embodiments, the special functions block 736 may include dedicated (non-programmable) functional blocks and/or include one or more interfaces to dedicated functional blocks, such as USB, a crystal oscillator drive, JTAG, and the like.

The programmable digital block 732 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 732 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 704) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× oversampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 734 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 734 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

The embodiments described above allow reducing water influence on the sensing device for low cost single layer designs. Some of these embodiments require additional shield layer, or external capacitors for carrying the shield signal. In other embodiments, described with respect to FIG. 8, there may be designs that do not require additional shield layers or external capacitors by using an electrical conduction layer on the touch side of the panel. In one embodiment, the electrical conduction layer has self-conductive material. The self-conductive material may have nearly 1-2 times the conductivity of liquid (e.g. water has around $$\frac{2 \cdot 10^{-5}}{\Omega \cdot m}$$

or 50K Ohms/sq) on the touch side of the panel. The electrical conduction layer may be a primary overlay or an additional overlay for waterproof realization. This structure can be used with self-capacitance sensing microcontrollers that do not allow shield electrode connections to the capacitance sensing pins, for example. Alternatively, the structure can be used with other capacitance-sensing devices and liquids as would be appreciated by one of ordinary skill in the art having the benefit of this disclosure.

Figure 8:
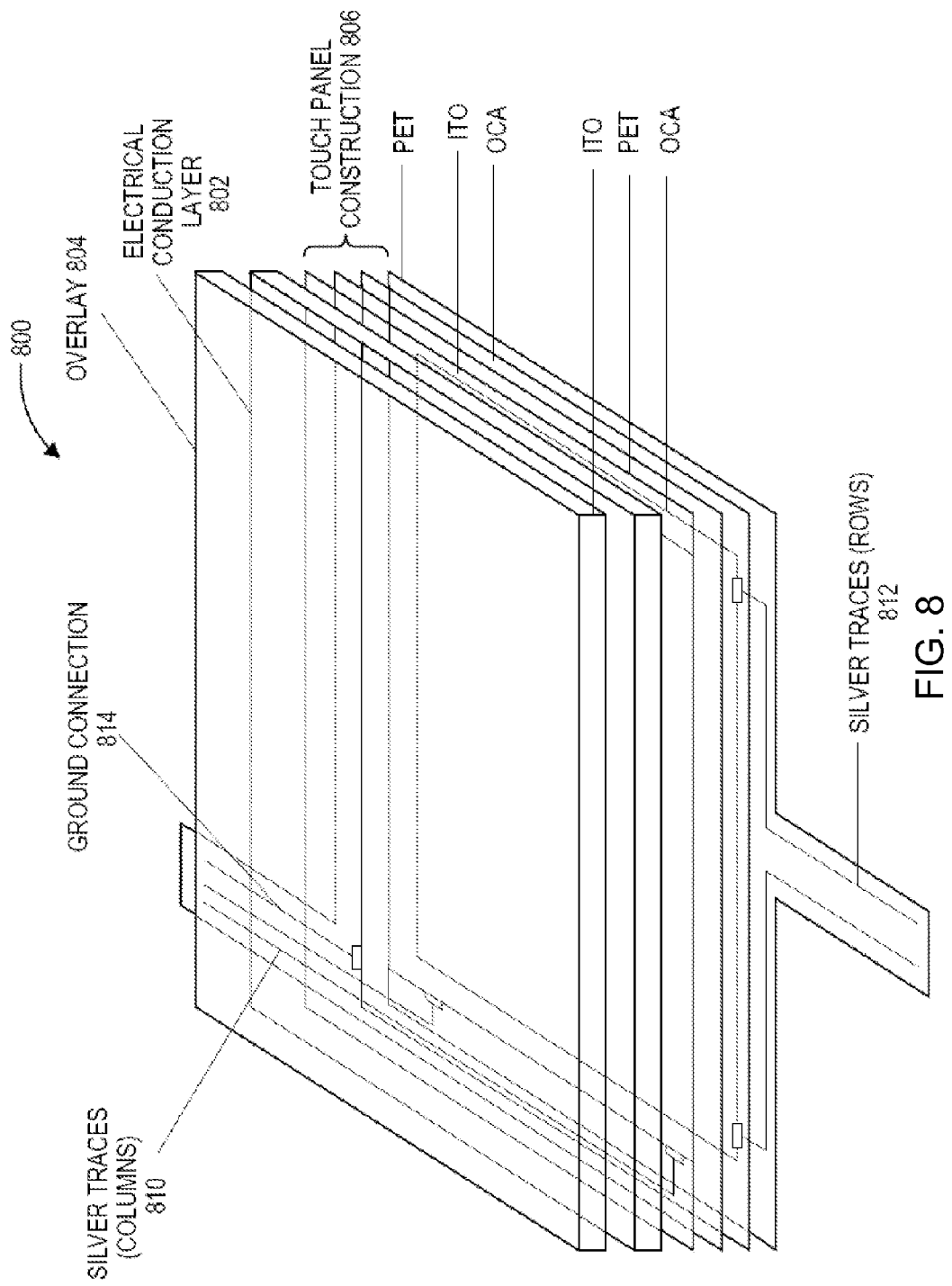
FIG. 8 illustrates a construction of a touch-sensing device, having an electrical conduction layer for reducing water influence on the touch-sensing device.

FIG. 8 illustrates construction of a touch-sensing device 800, having an electrical conduction layer 802 for reducing water influence on the touch-sensing device. In one embodiment, the electrical conduction layer 802 is self-conductive material. In another embodiment, the electrical conduction layer 802 has portions of self conductive material. In the depicted embodiment, the electrical conduction layer 802 is an additional overlay layer that is disposed below an overlay 804, which may be glass or may be a lens, or other types of overlays. The overlay 804 may be transparent material, semi-transparent, or opaque. Similarly, the electrical conduction layer 802 may be transparent, semi-transparent, or opaque. The electrical conduction layer 802 may a very thin layer of ITO, polymer materials, or the like. The electrical conduction layer 802 is disposed on the touch side of the touch panel construction 806. In the depicted embodiment, the touch panel construction 806 includes layers of Polyethylene terephthalate (PET), ITO, and Optically Clear Adhesive (OCA). The touch panel construction 806 also includes silver traces (columns) 810 and silver traces (rows) 812 printed or disposed on the layers of the touch panel construction 806. Alternatively, the touch panel construction 806 may include different layers than those depicted in FIG. 8.

In these embodiments, the total RAW signal value is algebraic sum of signals from a finger and water. It has been observed that even if the panel is completely covered by water (thickness of water does not have any influence), then the reaction on the finger can also be detected on top of the signals from the water. Thus, the main idea in these embodiments is to cover the panel with a conductive layer that is similar in conductivity to water so that additional water drops will not further influence the sensed signals. This allows the reaction to a finger to be as close to the same as seen on a dry panel. The electrical conduction layer introduces an artificial film of water on the touch-sensing surface so that the capacitance-sensing circuitry does not detect the presence of an actual water drop or water film, but can still detect a finger or other object. Increasing of electrical conductivity (or resistance decreasing) of the electrical conduction layer 802 decreases the capacitance-sensing circuitry's reaction to any the water drops, but with this increase, the reaction on a finger is decreased too. This may cause the signal shapes to become more spatial. For example, the signal from the water is decreased more than the signal from finger. By increasing the electrical conductivity, the signal shapes becomes more spatial, such that it looks as strong signal from the touch flow to all sensors. Conversely, decreasing of electrical conductivity (or resistance increasing) of the electrical conduction layer 802 improves the signal from a finger, but with this decrease, the reaction on water drops is increased too. As such, the electrical conductivity value for the electrical conduction layer 802 could be selected to be 1-2 times more than the electrical conductivity of liquid (e.g., water has close to $$\frac{2 \cdot 10^{-5}}{\Omega \cdot m}$$

or 50 KOhms/sq) in one embodiment. Alternatively, other materials having different electrical conductivity values may be used as would be appreciated by one of ordinary skill in the art having the benefit of this disclosure.

Figure 9A:
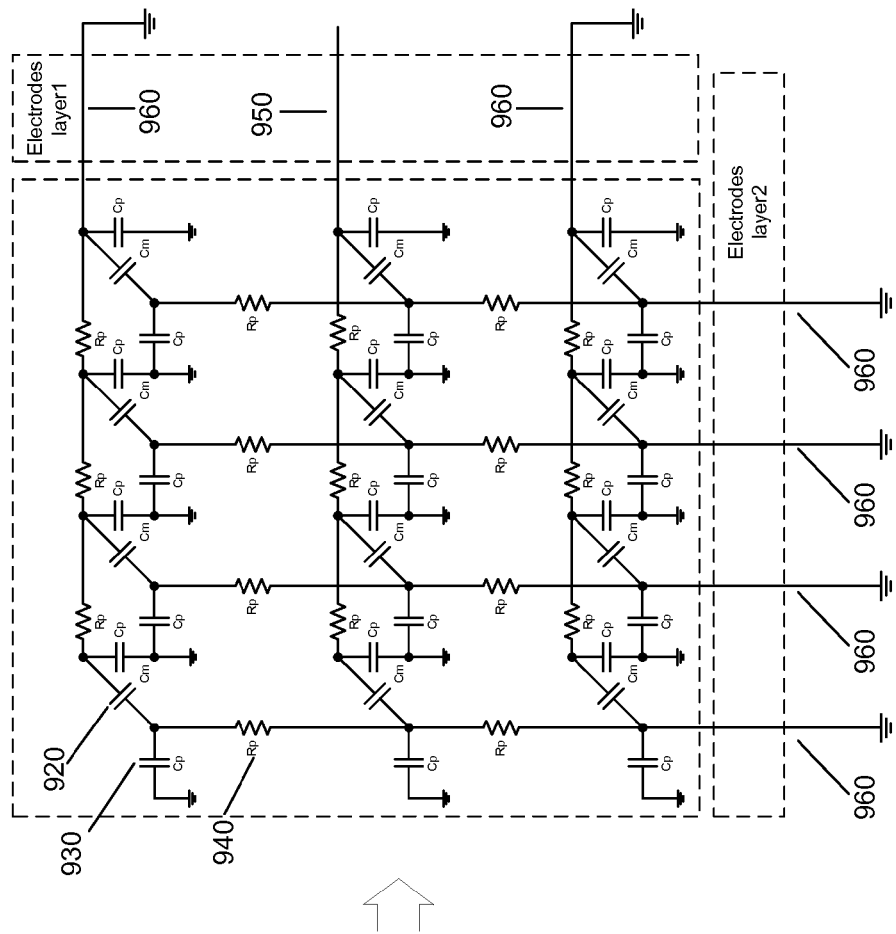
FIG. 9A illustrates a circuit model of a dual-dimension touch-sensing panel without a self-conductive layer according to one embodiment.
Figure 9A:
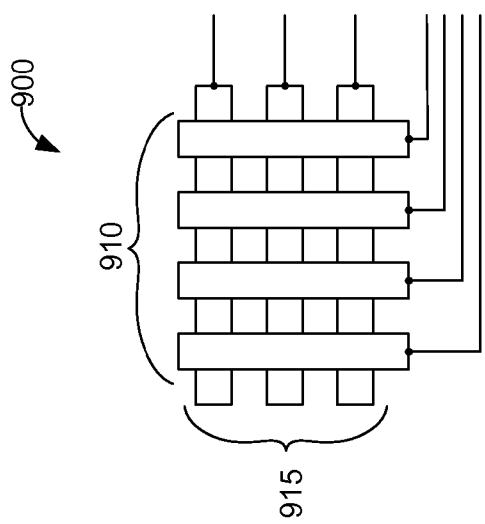

To better understand how self-conductive layer (e.g., electrical conduction layer 802) operation helps reduce the influence of water, the following description considers embodiments using ITO panel circuit models. Although ITO panel circuits are used, alternatively, other types of touch-sensing surfaces may be used. FIG. 9A illustrates a circuit model of a dual-dimension touch-sensing panel 900 without a self-conductive layer (e.g., 802) according to one embodiment. The touch panel 900 has a first layer of horizontal electrodes 915 and a second layer of vertical electrodes 910. The distributed panel model is represented by cell arrays in the horizontal and vertical directions. Each cell consists of the cell parasitic capacitance Cp 930, parasitic resistance Rp 940, and mutual capacitance between first and second layer electrode and adjacent electrodes in the same layer Cm 920. During scanning, only one electrode 950 is sensed, all remaining electrodes 960 in the first Layer 1 and second Layer 2 are grounded.

Figure 9B:
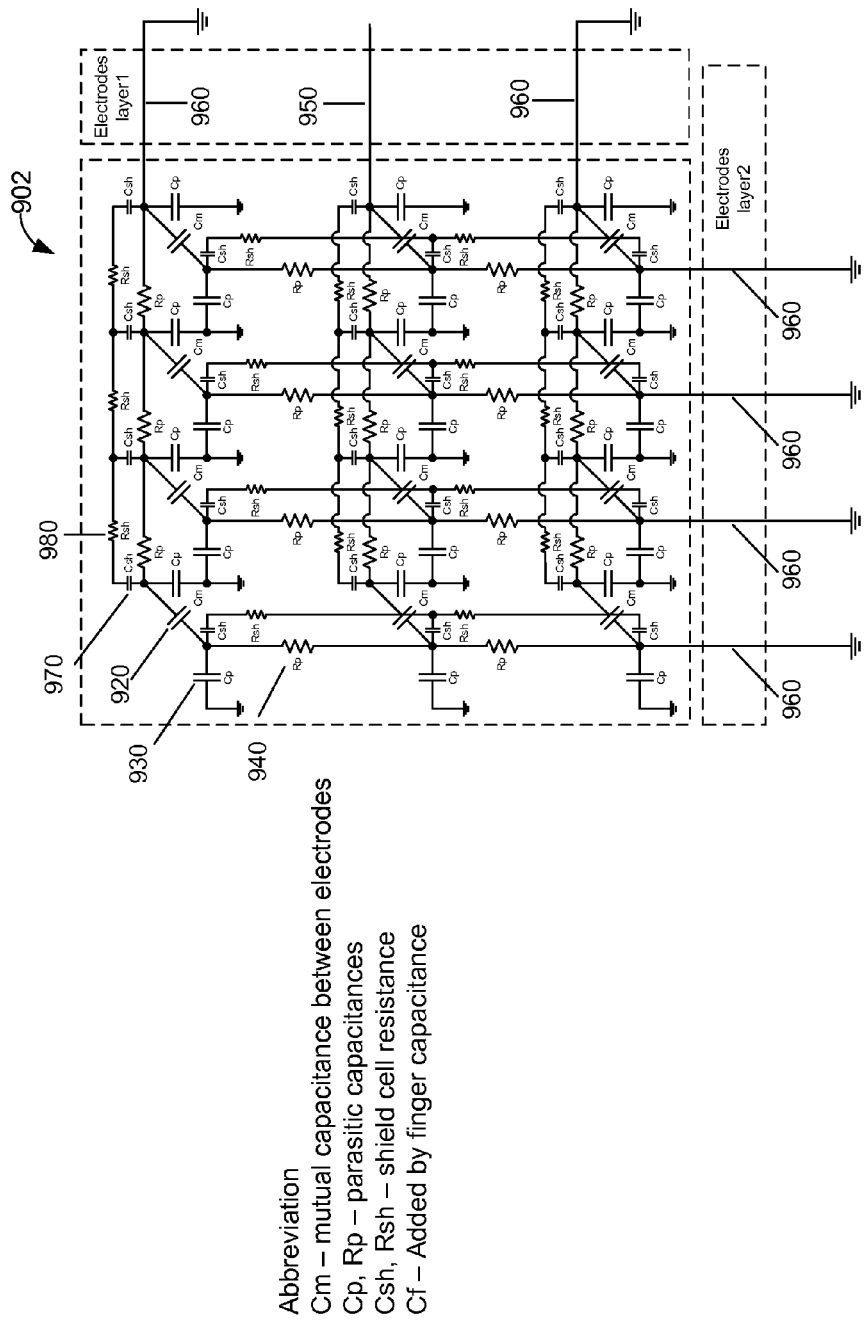
FIG. 9B illustrates a dual dimension circuit model for the touch-sensing panel with additional self-conductive layer, no water, and no finger touch, according to one embodiment.

FIG. 9B illustrates the panel model of a touch-sensing panel 902 with the electrical conduction layer 802 added (also referred to herein as the self-conductive layer) according to one embodiment. The self-conductive layer could be represented by the dual dimension circuit model as well, and the self-conductive layer 802 is represented as interconnected elementary RC cell network array. Each self-conductive layer cell is represented by connected in series cell capacitor Csh 970 and cell resistor Rsh 980. In order to simplify the discussion, the discussion and figures describes single dimension and consider circuit models for the individual electrodes, coupling to other electrodes is represented by grounded Cm 920 capacitors.

Figure 10A:
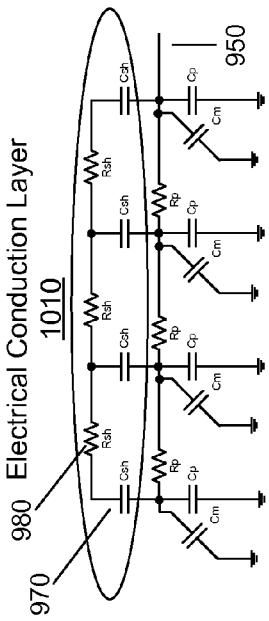
FIG. 10A illustrates a single electrode circuit model without water and finger touch according to one embodiment.

FIG. 10A illustrates a single electrode circuit model without finger touch or water presence according to one embodiment. In this case, the inter-electrode mutual capacitor Cm 920 is connected in parallel to the cell parasitic capacitor Cp 930. Cm capacitor is grounded, as all electrodes, which are not scanned, are grounded as well.

Figure 10B:
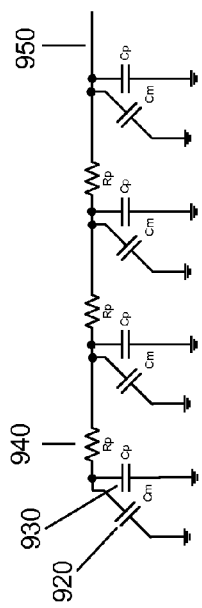
FIG. 10B illustrates the single electrode circuit model with self-conductive layer without water or finger touch according to one embodiment.

FIG. 10B illustrates the single electrode circuit model when self-conduction layer 1010 is added according to one embodiment. Self-conducting layer couples to the individual cells via elementary CshRsh networks.

Figure 10C:
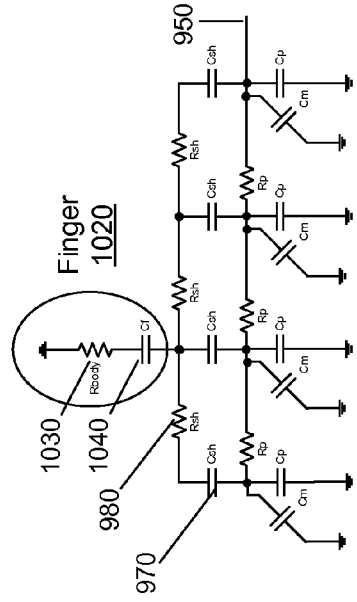
FIG. 10C illustrates the single electrode circuit model with finger touch and no water according to one embodiment.

FIG. 10C shows the finger 1020 touch model according to one embodiment. In this case, the finger equivalent RC network Cr 1040 and Rbody 1030 are connected in parallel to the Cp 930, increasing total sensing electrode 950 capacitance. This increase in capacitance causes the capacitance-sensing circuitry to measure an increase in the sensor signal.

Figure 10D:
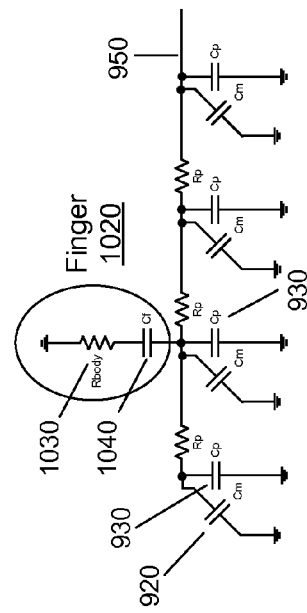
FIG. 10D illustrates the single electrode circuit model with self-conductive layer and finger touch and no water according to one embodiment.

FIG. 10D illustrates finger touch model for panel with added self-conductive layer according to one embodiment. In this case, the finger capacitance Cr 1040 is connected to the sensing electrode network via Csh capacitor, slightly reducing the touch signal.

Figure 10F:
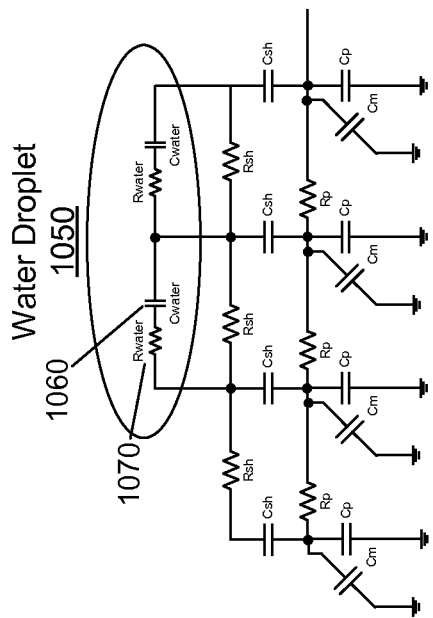
FIG. 10F illustrates the single electrode circuit model with self-conductive layer and water presence and no finger touch according to one embodiment.
Figure 10E:
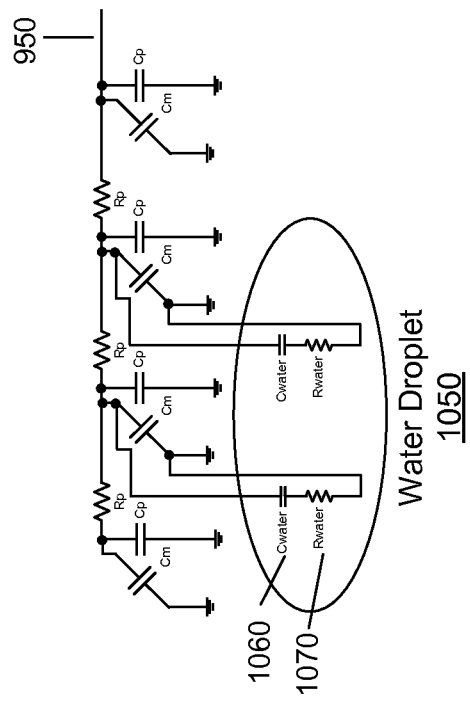
FIG. 10E illustrates the single electrode circuit model with water presence and no finger touch according to one embodiment.

FIG. 10E illustrates equivalent circuit diagram when water droplet 1050 is located on sensing electrode of the panel without self-conductive layer according to one embodiment. Taking into account that the adjacent electrodes to the sensing electrode are grounded, the added capacitance Cwater 1060 caused by the water droplet 1050 is connected in parallel to the parasitic capacitance Cp 930 and grounded mutual capacitor Cm 920, increasing the touch signal in similar as it happens from finger touch.

FIG. 10F illustrates what happens when water droplet 1050 is located on the panel with self-conductive layer according to one embodiment. In this case, the added water capacitance Cwater 1060 is connected in parallel to the self-conductive resistor Rsh 980 and there is no increasing sensing electrode 950 total capacitance, so water droplet 1050 does not cause the sensor signal to increase. Thus, the water presence does not cause sensor signal change, and thus, can be reduced and/or eliminated.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   measuring a first capacitance on a selected one or more of a plurality of sensor elements of a touch-sensing device during a standard scan;
   while measuring the first capacitance on the selected one or more of the plurality of sensor elements, coupling a reference voltage to non-selected ones of the plurality of sensor elements during the standard scan;
   determining whether a touch is detected in view of the first capacitance measured during the standard scan;
   in response to the touch not being detected in the standard scan, performing a subsequent standard scan; and
   in response to the touch detected in the standard scan, performing a waterproof scan to test for a presence of water on the touch-sensing device, the waterproof scan comprising:
   measuring a second capacitance on the selected one or more of the plurality of sensor elements during the waterproof scan;
   while measuring the second capacitance on the selected one or more of the plurality of sensor elements, applying a shield signal to the non-selected ones of the plurality of sensor elements during the waterproof scan; and
   outputting results of the standard scan when the touch is detected in view of the first capacitance measured during the standard scan and no water is detected in view of the second capacitance measured during the waterproof scan.

2. The method of claim 1, wherein said measuring the second capacitance comprises measuring the second capacitance using a first bus, and wherein said applying the shield signal comprises applying the shield signal to the non-selected ones of the plurality of sensor elements using a second bus.

3. The method of claim 2, wherein the first bus is an analog bus and the second bus is a digital bus, and wherein the shield signal is a digital signal.

4. The method of claim 1, wherein said measuring the second capacitance comprises supplying a first signal to the selected one or more of the plurality of sensor elements, and wherein the shield signal has a substantially same amplitude and phase as the first signal.

5. The method of claim 1, further comprising:
   measuring a third capacitance on a second selected one or more of the plurality of sensor elements; and
   while measuring the third capacitance on the second selected one or more of the plurality of sensor elements, applying the shield signal to non-selected ones of the plurality of sensor elements.

6. The method of claim 1, further comprising repeating said measuring while applying the shield signal for each of the plurality of sensor elements.

* * * * *